F. KUHN.
ELECTRICAL HEATER.
APPLICATION FILED AUG. 19, 1909.
979,515.
Patented Dec. 27, 1910.
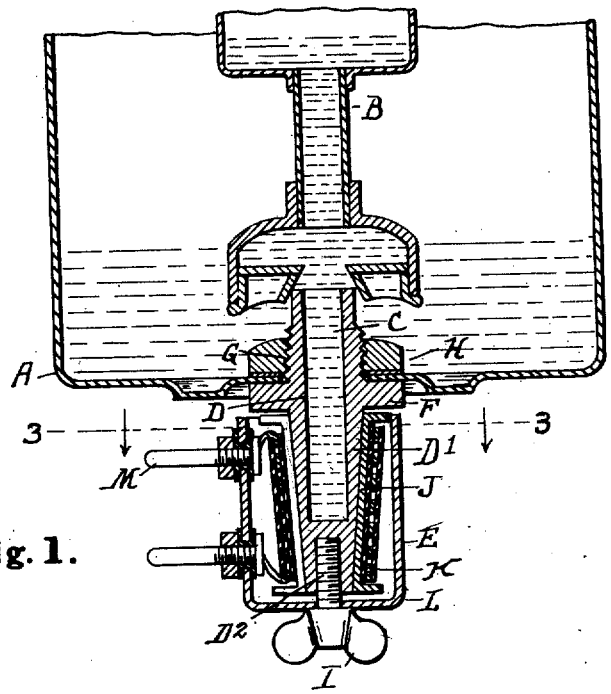
Fig. 1.
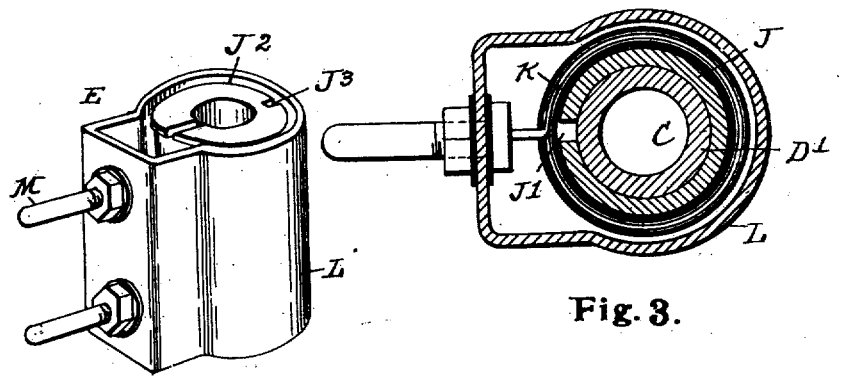
Fig. 2.
Fig. 3.
Witnesses
O. B. Baenziger
A. Kinsella
Inventor
Frank Kuhn
By Whittemore Hulbert + Whittemore
Attorneys

UNITED STATES PATENT OFFICE.

FRANK KUHN, OF DETROIT, MICHIGAN, ASSIGNOR TO AMERICAN ELECTRICAL HEATER COMPANY, OF DETROIT, MICHIGAN, A CORPORATION OF MICHIGAN.

ELECTRICAL HEATER.

979,515.  Specification of Letters Patent.  Patented Dec. 27, 1910.

Application filed August 19, 1909. Serial No. 513,629.

*To all whom it may concern:*

Be it known that I, FRANK KUHN, a citizen of the United States of America, residing at Detroit, in the county of Wayne and State of Michigan, have invented certain new and useful Improvements in Electrical Heaters, of which the following is a specification, reference being had therein to the accompanying drawings.

It is the object of the invention to obtain a construction of electric heater in which the heating unit is adapted to localize the heating effect so as to restrict the same to a comparatively small area.

It is a further object to render the unit readily attachable and detachable and to provide a good heating contact.

With these objects in view, the invention consists in the construction as hereinafter set forth.

In the drawings—Figure 1 is a vertical central section through the heater as applied to a coffee percolator; Fig. 2 is a perspective view of the unit detached; and Fig. 3 is a horizontal section.

My invention is more particularly designed for use in connection with coffee percolators, and such a construction is illustrated in the drawings, but it is obvious that it is also applicable to other uses.

As shown, A is the bottom of the coffee pot, B is a centrally-arranged riser tube, through which the heated water is passed to the coffee-holding receptacle, these parts being of any suitable construction, and not forming any portion of the present invention.

It is usual in the construction of percolators of the type illustrated to provide a small pocket below and in alinement with the tube B, said pocket having its walls formed integral with the bottom portion of the pot and being heated through the medium of said bottom, to which the gas flame, or other heater, is directly applied. In the present construction, I have formed this pocket, C, in a member D depending from the bottom A of the receptacle. The member D is surrounded by a heating unit E, which is clamped thereon, and from which the heat is conducted directly into the fluid within the pocket without first passing into the bottom A of the receptacle. Thus, the greater portion of the heat generated goes at once into the water within the pocket, and in this respect my construction has an advantage over the usual constructions where a considerable area of the bottom of the receptacle is heated simultaneously with the heating of the pocket.

More in detail, the member D is preferably formed with a shoulder F abutting against the bottom A and a threaded portion G above the bottom with which a lock nut H is engaged to clamp the parts together. The depending portion D' of the member D is preferably tapered and is circular in section, while at the lower end of this portion is a threaded socket $D^2$ for engaging a winged clamping screw I. The head of this screw bears against the lower end of the unit E and forces the same upward upon the tapering pin to insure a close metallic contact.

The unit E preferably consists of a metallic spool J longitudinally slotted upon one side, as at J', and surrounded by convolutions of an insulated helix K. This helix K is formed of suitable resistance material and is preferably in the form of a flattened wire or ribbon wound between outer and inner insulating sheaths K', preferably of mica. At the opposite ends of the spool J are retaining flanges $J^2$, but these are slotted at $J^3$ to permit of free contraction or expansion of the spool. L is an outer case surrounding the spool J and M are insulated terminal posts clamped upon a flattened portion L' of the outer case, being insulated therefrom, and connected respectively to the terminal ends of the helix K.

With the construction as described, in use the unit E is engaged with the tapering member D, to which it is clamped by the screw I. In clamping, the slotted spool J is slightly expanded by being forced up the taper of the member D, and as said spool is made of resilient material it will be forced into firm contact with a portion of the member D. Thus the heat generated in the helix and conducted therefrom to the spool will pass from the latter into the member D and into the fluid within the pocket. On the other hand, the spool D and helix K are separated by an air space from the outer case L so as to prevent the loss of heat in an outward direction and by nickel-plating the outer case, or otherwise producing a bright polished surface, the heat loss is reduced to the minimum.

In operation, the heat generated in the helix is sufficient to almost instantaneously boil the water in the pocket C, from which it passes upward through the tube B, being displaced by cold water from the outer receptacle A.

What I claim as my invention is:

1. In an electrical heater the combination with a heating unit and a member to be heated thereby, one of said members being provided with a tapering pin and the other with a socket detachably engaging said pin, said pin and socket being in heat conducting contact and clamping means for holding said members in engagement.

2. In an electrical heater the combination of a member to be heated and a heating unit, one of said members having a tapering pin and the other being provided with a longitudinally slotted tapering socket engaging said pin, and interclamping means for forcing said tapering pin into said socket.

3. In an electrical heater the combination of a member to be heated and a heating unit, one of said members being provided with a pin and the other of said members being provided with a socket detachably engaging said pin, said socket member being resilient and expanded by engagement of said pin.

4. In an electrical heater, a member to be heated provided with a projection of smaller cross-sectional area than said member, a heating unit comprising a sleeve or spool adapted to engage the projection, a resistance conductor wound upon said spool and insulated therefrom, a casing surrounding the spool, and insulated contact members secured to said casing and connected with the ends of said resistance conductor.

5. In an electrical heater, a heating unit, comprising a split sleeve, a resistance conductor wound about said sleeve and insulated therefrom, a casing surrounding said sleeve and resistance conductor, insulated terminal contacts mounted on said casing and connected with the resistance conductor, and a member to be heated insertible in said sleeve into contact therewith.

6. In an electrical heater, the combination with a member provided with a projection of lesser cross-sectional area than said member; having a fluid-containing pocket therein, of a member adapted to be sleeved upon said projection, and an electrical heating unit in said last-mentioned member.

7. The combination with a receptacle, of a hollow member of lesser cross-sectional area than the receptacle depending from the same, and forming a fluid-containing pocket, and an electrical heating unit in the form of a detachable sleeve surrounding said depending member.

8. The combination with a receptacle, of a hollow member of lesser cross-sectional area than the receptacle depending from the same, and of tapering form; a tapering sleeve for engaging said tapering hollow member, and an electrical heating resistance surrounding said sleeve and insulated therefrom.

9. In an electrical heater the combination with a heating unit, of a member to be heated thereby, one of said members being provided with a tapering pin and the other with a socket detachably engaging the pin, the contacting faces of the pin and socket being of heat conducting metal, and means for forcing said tapering pin into the socket.

In testimony whereof I affix my signature in presence of two witnesses.

FRANK KUHN.

Witnesses:
NELLIE KINSELLA,
JAMES P. BARRY.